(12) United States Patent
Yang

(10) Patent No.: US 8,605,811 B2
(45) Date of Patent: Dec. 10, 2013

(54) METHOD, APPARATUS, AND SYSTEM FOR DATA SIGNAL TRANSMISSION IN MULTI-ANTENNA SYSTEM

(75) Inventor: Xuezhi Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/407,054

(22) Filed: Feb. 28, 2012

(65) Prior Publication Data

US 2012/0155571 A1   Jun. 21, 2012

Related U.S. Application Data

(63) Continuation of application No. PCT/CN2010/076470, filed on Aug. 30, 2010.

(30) Foreign Application Priority Data

Aug. 28, 2009 (CN) .......................... 2009 1 0091907

(51) Int. Cl.
  *H04B 7/02*  (2006.01)
(52) U.S. Cl.
  USPC ........... 375/267; 375/295; 375/259; 375/260; 375/219
(58) Field of Classification Search
  USPC .................... 375/267, 295, 259, 260, 219
  See application file for complete search history.

(56) References Cited

U.S. PATENT DOCUMENTS

| | | | |
|---|---|---|---|
| 7,430,243 B2* | 9/2008 | Giannakis et al. | 375/267 |
| 8,254,487 B2* | 8/2012 | Tsai et al. | 375/267 |
| 8,271,043 B2* | 9/2012 | Kim et al. | 455/562.1 |
| 8,358,611 B2* | 1/2013 | Ko et al. | 370/319 |
| 2005/0105631 A1* | 5/2005 | Giannakis et al. | 375/267 |
| 2006/0008021 A1* | 1/2006 | Bonnet | 375/267 |
| 2006/0034383 A1* | 2/2006 | Su et al. | 375/267 |
| 2006/0120477 A1* | 6/2006 | Shen et al. | 375/267 |
| 2007/0041457 A1* | 2/2007 | Kadous et al. | 375/260 |

(Continued)

FOREIGN PATENT DOCUMENTS

| | | |
|---|---|---|
| CN | 101043242 A | 9/2007 |
| CN | 101127550 A | 2/2008 |

(Continued)

OTHER PUBLICATIONS $1^{st}$ Office Action in corresponding Chinese Patent Application No. 200910091907.2 (Jul. 16, 2012).

(Continued)

*Primary Examiner* — Kenneth Lam
(74) *Attorney, Agent, or Firm* — Leydig, Voit & Mayer, Ltd.

(57) ABSTRACT

A method and an apparatus for data signal transmission are disclosed. A data signal is coded through space-time-frequency coding to form k1 space-time-frequency bit streams. P of the k1 space-time-frequency bit streams are divided into $K_i$ orthogonal components respectively, in which a modulus of an inner product of any two of the $K_i$ orthogonal components is equal to zero or smaller than a set value. The data signal can be restored through the $K_i$ orthogonal components, but cannot be restored though the remaining orthogonal components apart from any one non-zero orthogonal component. All orthogonal components are provided for virtual antennas of N base stations, and are mapped to $M_j$ physical antennas of the base station for transmission.

18 Claims, 12 Drawing Sheets

(56) References Cited

U.S. PATENT DOCUMENTS

| | | | |
|---|---|---|---|
| 2007/0135161 A1* | 6/2007 | Molnar et al. | 455/553.1 |
| 2007/0230383 A1* | 10/2007 | Yune et al. | 370/310 |
| 2008/0032744 A1* | 2/2008 | Khan et al. | 455/562.1 |
| 2008/0037679 A1* | 2/2008 | Khan et al. | 375/267 |
| 2008/0303701 A1* | 12/2008 | Zhang et al. | 341/106 |

FOREIGN PATENT DOCUMENTS

| | | |
|---|---|---|
| CN | 101141185 A | 3/2008 |
| CN | 101288245 A | 10/2008 |
| CN | 101378301 A | 3/2009 |
| CN | 101425990 A | 5/2009 |

OTHER PUBLICATIONS

Written Opinion of the International Searching Authority in corresponding PCT Application No. PCT/CN2010/076470 (Dec. 9, 2010).
International Search Report in corresponding PCT Application No. PCT/CN2010/076470 (Dec. 9, 2010).
Zhang et al., "On the Investigation of DVB-H Network Coverage with the Application of Transmit Diversity," 2007, School of Engineering and Design, Brunel University, Devon, United Kingdom.
$2^{nd}$ Office Action in corresponding Chinese Patent Application No. 200910091907.2 (Mar. 14, 2013).

* cited by examiner

METHOD, APPARATUS, AND SYSTEM FOR DATA SIGNAL TRANSMISSION IN MULTI-ANTENNA SYSTEM

CROSS-REFERENCE TO RELATED APPLICATIONS

This application is a continuation of an International Application No. PCT/CN2010/076470, filed on Aug. 30, 2010, which claims priority to Chinese Patent Application No. 200910091907.2, filed on Aug. 28, 2009, both of which are incorporated herein by reference in their entireties.

TECHNICAL FIELD

The present invention relates to radio communication technologies, and in particular, to a method, an apparatus, and a system for data signal transmission in a multi-antenna system.

BACKGROUND

With the development of a radio communication service, a demand for a bandwidth of a radio communication system is becoming higher and higher, which leads to an increasing shortage of available frequency band resources. Therefore, how to improve a utilization efficiency of a frequency band becomes a key issue in radio communication research. Technologies that can effectively improve the utilization efficiency of the frequency band include: multiple access, signal detection, modulation, and channel encoding. Furthermore, a multi-antenna system (MAS) becomes increasingly important for a radio communication technology.

In a cellular mobile communication system, the MAS may be set in a base station of each cellular cell. The MAS may include multiple physical antennas to transmit a signal. The physical antenna is also known as an antenna array element. In the multi-antenna system, multiple antenna array elements and signal processing units are organically combined, and thus transmission and reception can be adaptively optimized according to the change of a channel environment. A communication service provided by the multi-antenna system not only may be a unicast signal that is transmitted through a dedicated channel to a particular mobile terminal, but also may be a broadcast multicast signal that is transmitted through a common channel to all mobile terminals. The broadcast multicast signal may be, such as a multimedia broadcast multicast service (MBMS) signal, system information transmitted through a broadcast channel, a reference signal transmitted through a synchronization channel, and a pilot, a paging, and a common control message that are transmitted through a Forward Access Channel (FACH).

For the transmission of a unicast signal, a technology such as beam forming or precoding may be provided for the multi-antenna system to implement the transmission of the unicast signal. For example, a Smart Antennas (SA) system, also known as an antenna array system (AAS), is a kind of multi-antenna system. Spacing between antenna array elements of the SA is smaller than a correlation distance of a channel. In the SA system, the beam forming may be implemented by a signal correlation between the antenna array elements. Furthermore, in the SA, a narrow beam with a high gain is adaptively directed at a mobile terminal in communication, and a null is adjusted to align with an interference direction, so as to minimize the interference with other users.

For an SA system, the beam forming may concentrate energy of a transmission signal on a quite narrow beam and generate a gain in a specified direction. Therefore, if M physical antennas are used to achieve the same coverage in a dedicated channel as that of a single omni-directional antenna, the transmission power needed on each antenna is only $1/M^2$ of that on the single antenna. M is a natural number that is at least equal to 2. Thus, signal power of each physical antenna can be amplified respectively by using a low power amplifier.

However, the prior art has the following defects: an amplifier with high power is needed to amplify the signal of the physical antenna in order to obtain omni-directional cell coverage in a common channel, which significantly increases a device cost. Furthermore, when a space-time-frequency coding technology is adopted in the SA system, configuration of an antenna array needs to be strictly limited and a hardware structure of a receiver also needs to be fixed, which lead to poor extensibility.

SUMMARY OF THE INVENTION

Embodiments of the present invention provide a method, an apparatus, and a system for data signal transmission in a multi-antenna system, so that high quality data signal transmission is obtained with a low cost.

In one aspect of the present invention, a method for data signal transmission is provided. In the method, a stream of a data signal is coded by space-time-frequency coding to form k1 space-time-frequency bit streams, in which k1 is a natural number that is greater than or equal to 2; P of the k1 space-time-frequency bit streams are respectively divided into $K_i$ (i=1, 2, ..., P) orthogonal components, in which P is a natural number that is greater than or equal to 2, and is smaller than or equal to k1, and $K_i$ is a natural number that is greater than or equal to 2, and for each of the P space-time-frequency bit streams, a modulus of an inner product of any two of the $K_i$ orthogonal components is equal to zero or smaller than a set value, the data signal can be restored through the $K_i$ orthogonal components and cannot be restored with the remaining ($K_i$−1) orthogonal components apart from any one non-zero orthogonal component; and all of the $K_i$ orthogonal components corresponding to the P space-time-frequency bit streams are provided for N base stations to transmit, in which N is a natural number that is greater than or equal to 2 and is smaller than or equal to P. The step of providing all the $K_i$ orthogonal components for the N base stations to transmit includes: providing all the $K_i$ orthogonal components corresponding to the P space-time-frequency bit streams as transmission signals for virtual antennas of the N base stations, in which a sum of the number $L_j$ (j=1, 2, ..., N) of virtual antennas of each base station is equal to a sum of values of the $K_i$ of each space-time-frequency bit stream; and mapping transmission signals corresponding to the $L_j$ virtual antennas of the each base station to $M_j$ physical antennas of the corresponding base station respectively to transmit, in which $M_j$ is a natural number that is greater than or equal to 2.

In another aspect of the present invention, a method for data signal transmission in a communication system is also provided. In the method, space-time-frequency coding is performed on a stream of data signal to form k1 space-time-frequency bit streams, in which k1 is a natural number that is greater than or equal to 2; P of the k1 space-time-frequency bit streams are respectively divided into $K_i$ (i=1, 2, ..., P) orthogonal components to form P groups of $K_i$ orthogonal components, in which P is a natural number that is greater than or equal to 1 and is smaller than k1, and $K_i$ is a natural number that is greater than or equal to 2, for each of the P space-time-frequency bit streams, a modulus of an inner product of any two of the $K_i$ orthogonal components is equal to zero or smaller than a set value, the data signal can be restored through the $K_i$ orthogonal components, but cannot be restored by the remaining ($K_i-1$) orthogonal components of the $K_i$ orthogonal components apart from any one non-zero orthogonal component; and all the $K_i$ orthogonal components corresponding to the P space-time-frequency bit streams are provided for N base stations to transmit, in which N is a natural number that is greater than or equal to 1 and is smaller than P. The step of providing all the $K_i$ orthogonal components for the N base stations to transmit includes: providing all the $K_i$ orthogonal components corresponding to the P space-time-frequency bit streams as transmission signals for virtual antennas of the N base stations, in which a sum of the number $L_j$ (j=1, 2, ..., N) of virtual antennas of each base station is equal to a sum of the values of the $K_i$ of each space-time-frequency bit stream; and mapping transmission signals corresponding to the virtual antennas of each base station to $M_j$ physical antennas of the corresponding base station for transmission, in which is a natural number that is greater than or equal to 2; and providing the remaining (k1−P) of the k1 space-time-frequency bit streams for physical antennas of (k1−P) base stations to transmit, in which one space-time-frequency bit stream is provided for one base station respectively.

In another aspect of the present invention, a method for data signal transmission in a multi-antenna system is provided. The method includes:

dividing a symbol stream of data signal into K orthogonal components, in which a modulus of an inner product of any two of the K orthogonal components is equal to zero or smaller than a set value, the data signal can be restored through the K orthogonal components, but cannot be restored through the remaining (K−1) of the K orthogonal components apart from any one non-zero orthogonal component, in which K is a natural number that is greater than or equal to 2;

providing the K orthogonal components as transmission signals for K virtual antennas respectively; and mapping K transmission signals of the K virtual antennas to M physical antennas to transmit, in which M is a natural number that is greater than or equal to 2.

In another aspect of the present invention, an apparatus for data signal transmission in a multi-antenna system is provided. The apparatus includes:

a converting module, configured to divide a symbol stream of data signal into K orthogonal components, in which K is a natural number that is greater than or equal to 2, a modulus of an inner product of any two of the K orthogonal components is equal to zero or smaller than a set value, and the data signal can be restored through the K orthogonal components but cannot be restored through the remaining (K−1) of the K orthogonal components apart from any one non-zero orthogonal component;

a transferring module, configured to provide the K orthogonal components as transmission signals for K virtual antennas respectively; and a mapping module, configured to map K transmission signals of the K virtual antennas to M physical antennas for transmission, in which M is a natural number that is greater than or equal to 2.

In another aspect of the present invention, a system for data signal transmission in a multi-antenna system is provided. The system includes at least one transmitter and at least one receiver, where:

the transmitter is configured to: divide a symbol stream of data signal into K orthogonal components, in which K is a natural number that is greater than or equal to 2, a modulus of an inner product of any two of the K orthogonal components is equal to zero or smaller than a set value, and the data signal can be restored through the K orthogonal components but cannot be restored through the remaining (K−1) of the K orthogonal components apart from any one non-zero orthogonal component; provide the K orthogonal components as transmission signals for K virtual antennas; and map K transmission signals of the K virtual antennas to M physical antennas for transmission, in which M is a natural number that is greater than or equal to 2; and the receiver is configured to receive signals of the K orthogonal components from the transmitter, and obtain the data signal after demodulation processing.

It can be seen from the foregoing technical solutions that, in the embodiments of the present invention, a symbol stream of data signal is divided into K orthogonal components, and the orthogonal components are mapped through virtual antennas to physical antennas for transmission. Because the K orthogonal components are orthogonal or nearly orthogonal, transmission signals of the virtual antennas are mapped to the physical antennas for transmission, and no interference effect occurs between the orthogonal components when transmitted through the physical antennas or the interference effect is acceptable, so that omni-directional cell coverage is obtained. Furthermore, transmission capability of each physical antenna is fully utilized, so that a power amplifier with lower power may be used.

BRIEF DESCRIPTION OF THE DRAWINGS

Accompanying drawings described herein are provided for better understanding of the present invention. The accompanying drawings are a part of the application, but are not intended to limit the scope of the present invention. In the accompanying drawings.

DETAILED DESCRIPTION OF THE EMBODIMENTS

Figure 1:
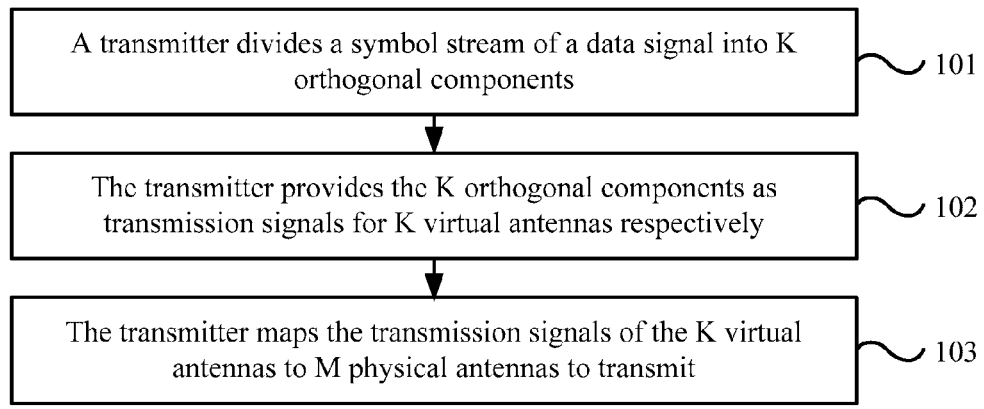
FIG. 1 is a flowchart of a method for data signal transmission in a multi-antenna system according to a first embodiment of the present invention.

In order to make the objectives, technical solutions, and advantages of the present invention clearer, the present invention is further described in detail below through embodiments with reference to the accompanying drawings. Here, the exemplary embodiments and illustration of the present invention are only intended to explain the present invention, rather than to serve as a limitation of the present invention.

A method for data signal transmission is provided according to an embodiment of the present invention. In the method, a stream of a data signal is coded by space-time-frequency coding to form k1 space-time-frequency bit streams, in which k1 is a natural number that is greater than or equal to 2; P of the k1 space-time-frequency bit streams are respectively divided into $K_i$ (i=1, 2, ..., P) orthogonal components, for each of the P space-time-frequency bit stream, a modulus of an inner product of any two of the $K_i$ orthogonal components is equal to zero or smaller than a set value, and the data signal can be restored through the $K_i$ orthogonal components but cannot be restored through the remaining ($K_i$−1) orthogonal components of the $K_i$ orthogonal components apart from any one non-zero orthogonal component, in which P is a natural number that is greater than or equal to 2 and is smaller than or equal to k1, and $K_i$ is a natural number that is greater than or equal to 2; and all orthogonal components corresponding to all the P space-time-frequency bit streams are provided for N base stations for transmission, in which N is a natural number that is greater than or equal to 2 and is smaller than or equal to P. The step of providing for the N base stations for transmission includes: all $K_i$ orthogonal components corresponding to the P space-time-frequency bit streams are provided for virtual antennas of the N base stations, in which a sum of the number $L_j$ (j=1, 2, ..., N) of virtual antennas of each base station is equal to a sum of a value of the $K_i$ of each space-time-frequency bit stream; and transmission signals corresponding to the $L_j$ virtual antennas of each base station are mapped respectively to $M_j$ physical antennas of the base station respectively for transmission, in which $M_j$ is a natural number that is greater than or equal to 2.

A method for data signal transmission in a communication system is provided according to another embodiment of the present invention. In the method, space-time-frequency coding is performed on a stream of a data signal to form k1 space-time-frequency bit streams, where k1 is a natural number that is greater than or equal to 2; P of the k1 space-time-frequency bit streams are respectively divided into $K_i$ (i=1, 2, ..., P) orthogonal components, in which a modulus of an inner product of any two of the $K_i$ orthogonal components of each space-time-frequency bit stream is equal to zero or smaller than a set value, and the data signal can be restored through the $K_i$ orthogonal components, but cannot be restored through the remaining ($K_i$−1) orthogonal components apart from any one non-zero orthogonal component, P is a natural number that is greater than or equal to 1 and is smaller than k1, and $K_i$ is a natural number that is greater than or equal to 2; and all orthogonal components corresponding to the P space-time-frequency bit streams are provided for N base stations for transmission, in which N is a natural number that is greater than or equal to 1 and that is smaller than P. The step of providing all orthogonal components corresponding to the P space-time-frequency bit streams for the N base stations for transmission includes: all $K_i$ orthogonal components corresponding to the P space-time-frequency bit streams are provided as transmission signals for virtual antennas of the N base stations, in which a sum of the number $L_j$ (j=1, 2, ..., N) of the virtual antennas of each base station is equal to a sum of the values of the $K_i$ of each space-time-frequency bit stream; and the transmission signals corresponding to the $L_j$ virtual antennas of each base station are respectively mapped to $M_j$ physical antennas of the corresponding base station to transmit, in which $M_j$ is a natural number that is greater than or equal to 2; and the remaining (k1−P) space-time-frequency bit streams are provided for physical antennas of (k1−P) base stations to transmit, in which each of the (k1−P) space-time-frequency bit stream is provided for one of the (k1−P) base station respectively.

FIG. 1 is a flowchart of a method for data signal transmission in a multi-antenna system according to a first embodiment of the present invention. The transmission method in this embodiment may be executed by a transmitter that is disposed on a base station of a radio communication system. The method may include the following steps:

Step 101: The transmitter divides a symbol stream of a data signal into K orthogonal components, in which a modulus of an inner product of any two of the K orthogonal components is equal to zero or smaller than a set value. K is a natural number that is greater than or equal to 2. The data signal can be restored through the K orthogonal components according to a certain method, but cannot be restored through the remaining (K−1) of the K orthogonal components apart from any non-zero orthogonal component.

If an inner product of any two of K orthogonal components is equal to zero, the K orthogonal components are considered as completely orthogonal, and thus an interference effect can be completely avoided. If the inner product of any two of the K orthogonal components is smaller than a certain value, the interference effect caused by the K orthogonal components is also acceptable, which, as can be understood by those skilled in the art, can also implement the technical solutions of the present invention. For a purpose of clarity, the following embodiments are described by taking K orthogonal components that are completely orthogonal as an example. A data signal in this embodiment may be a broadcast multicast signal, or a unicast signal. The following embodiments are all described by taking the broadcast multicast signal as an example, but those skilled in the art may understand that the technical solutions of the embodiments of the present invention are also applicable to various kinds of data signals such as the unicast signal.

In the preceding step 101, the symbol stream is a data stream that is to be processed before transmission, for example, may be a complex symbol stream that is formed by information bit stream, which may be in the form of "0", "1", after channel coding and constellation mapping.

Step 102: The transmitter provides the K orthogonal components as transmission signals for K virtual antennas respectively.

Step 103: The transmitter maps the transmission signals of the K virtual antennas to M physical antennas to transmit, in which M is a natural number that is greater than or equal to 2.

With the preceding technical solution, omni-directional coverage of a broadcast multicast signal may be obtained. That is, the signal is transmitted by the physical antenna to all mobile terminals in a current cell. The K orthogonal components may be omni-directionally transmitted from K physical antennas, and may also be omni-directionally transmitted from M physical antennas. Then step 103 in the preceding may specifically include:

Step 1031: The transmitter maps the K transmission signals of the K virtual antennas to M transmission signals according to an M*K dimensional antenna mapping matrix;

Step 1032: The transmitter transmits the M transmission signals from M physical antennas respectively.

The foregoing technical solution may be understood by introducing a concept of a virtual antenna. An antenna mapping matrix may be represented by the following formula:

Where, $x'_1\ x'_2\ \ldots\ x'_K$ represent transmission signals of the K virtual antennas, $$\begin{bmatrix} x_1 \\ x_2 \\ \vdots \\ x_M \end{bmatrix} = \begin{bmatrix} w_1^{(1)} & w_1^{(2)} & \ldots & w_1^{(K)} \\ w_2^{(1)} & w_2^{(2)} & \ldots & w_2^{(K)} \\ \vdots & \vdots & \ddots & \vdots \\ w_M^{(1)} & w_M^{(2)} & \ldots & w_M^{(K)} \end{bmatrix} \begin{bmatrix} x'_1 \\ x'_2 \\ \vdots \\ x'_K \end{bmatrix}$$

$x_1\ x_2\ \ldots\ x_M$ represent transmission signals of the M physical antennas, which are correlated by an antenna mapping matrix, as shown in the preceding formula. It can be seen that, each virtual antenna k corresponds to a weight vector $[w_1^{(k)}\ w_2^{(k)}\ \ldots\ w_M^{(k)}]$, in which k is the sequence number of a virtual antenna. For example, when the number of the physical antennas is 4, a 4-dimensional weight vector may be expressed as $[1\ 0\ 0\ 0]^T$, and thus each virtual antenna corresponds to one physical antenna. Preferably, the number of the virtual antennas is equal to that of the physical antennas, that is, K=M, and the antenna mapping matrix is set, so that a virtual antenna corresponds to a physical antenna in a one-to-one manner, which is a usual circumstance where a signal to be transmitted is provided for the physical antenna directly, and by default, the virtual antenna is fixedly corresponding to the physical antenna in a one-to-one manner. Alternatively, K=2M, that is, one virtual antenna corresponds to two cross-polarized physical antennas.

In practical application, a value of a matrix dot in the antenna mapping matrix may be arbitrary. The transmission signal of the virtual antenna is transmitted from one or more corresponding physical antennas after being weighted by a coefficient of the weight vector.

By using the antenna mapping matrix, the number of physical antennas may be configured more flexibly, and by adjusting the antenna mapping matrix, the number of physical antennas may be adapted to, so that good extensibility is achieved.

Figure 2:
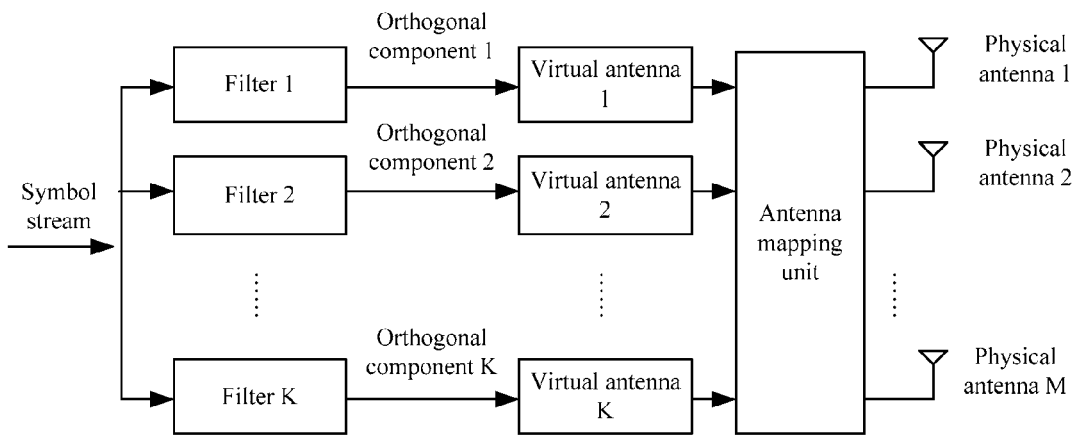
FIG. 2 is a block diagram showing an example of the method for data signal transmission in a multi-antenna system according to the first embodiment of the present invention.

FIG. 2 is a block diagram showing a principle of the method for data signal transmission in a multi-antenna system according to an embodiment of the present invention. In this embodiment, a complex symbol stream may be divided into K orthogonal components through a generalized filter. As shown in FIG. 2, the symbol stream is input to K filters respectively to form K orthogonal components. The K orthogonal components are provided for K virtual antennas, and transmitted by M physical antennas after being processed by an antenna mapping unit according to an antenna mapping matrix.

The generalized filter has multiple specific forms. For example, each filter may be a subcarrier group of an Orthogonal Frequency Division Multiplexing (OFDM) system, or may be a code group in Code Division Multiple Access (CDMA) system. Furthermore, there may be many ways to form the orthogonal components. For example, a symbol stream of a broadcast multicast signal may be divided into K orthogonal components by adopting mutually orthogonal frequency bands, mutually orthogonal subcarrier groups, or mutually orthogonal code groups.

With the technical solution in this embodiment, the K orthogonal components are orthogonal or nearly orthogonal, and if a transmission signal of a virtual antenna is mapped to a physical antenna in a one-to-one manner to transmit, no interference effect occurs between the orthogonal components when transmitted through the physical antenna or the interference effect is acceptable. Therefore, omni-directional cell coverage can be obtained. Furthermore, transmission capability of each physical antenna is fully utilized, so that a power amplifier with lower power may be used. In addition, for a receiver, it is unnecessary to identify that a received signal is transmitted by multiple physical antennas, and the reception at the receiver is similar to the reception of a signal that is transmitted by a single physical antenna. Therefore, good compatibility is obtained.

Therefore, compared with the prior art, the technical solution of the preceding embodiments has the following advantages: (1) Omni-directional cell coverage is obtained with a multi-antenna system. That is, transmission of a broadcast multicast signal is realized. Furthermore, a power amplifier with high power does not need to be used, and only a power amplifier with low power may need to be provided for each physical antenna, so that the cost is significantly decreased. (2) For a receiver, it is unnecessary to distinguish whether a signal of the orthogonal components is transmitted through a single physical antenna or multiple physical antennas, therefore, there is unnecessary to change a hardware structure of the receiver even if the number of the physical antennas through which the signal is transmitted to the receiver changes.

Furthermore, the introduction of the virtual antenna further makes design of both a physical antenna and a coding mode more flexible. The antenna mapping matrix may be fixed to provide a fixed mapping relationship. The antenna mapping matrix may also be variable, that is, when it is detected that a trigger condition for updating the mapping matrix is generated, the antenna mapping matrix may be updated, so that a mapping relationship between the virtual antenna and the physical antenna changes. For example, the trigger condition for updating the mapping matrix may be that a timing value starting from the last update of the antenna mapping matrix reaches a set threshold, that is, the mapping relationship changes over time. When K=M and the virtual antenna is corresponding to the physical antenna in a one-to-one manner, the update of the antenna mapping matrix may be: a corresponding relationship between the virtual antenna and the physical antenna is cyclically shifted, so that the virtual antennas are mapped sequentially, according to a preset sequence, to the physical antennas whose sequence is preset.

Figure 3:
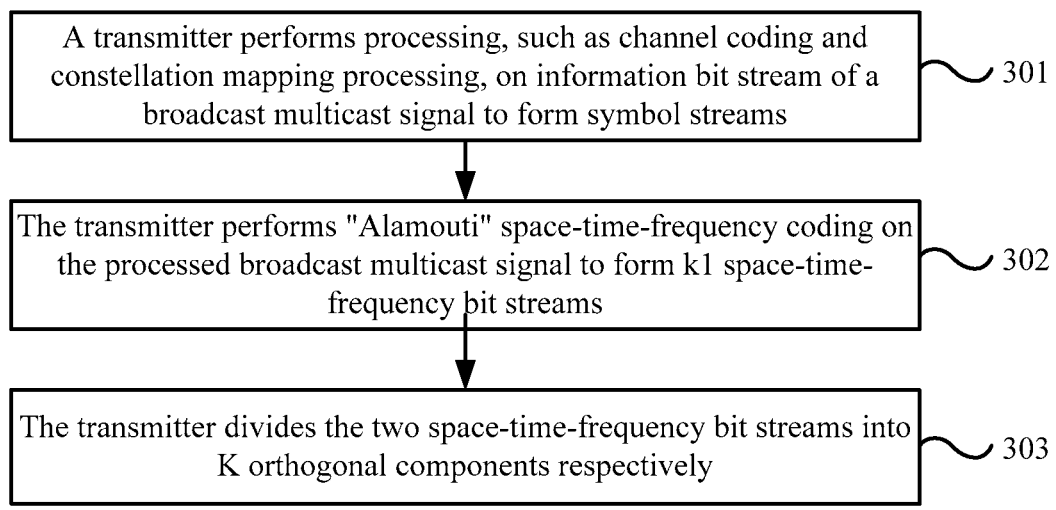
FIG. 3 is a flowchart of a method for data signal transmission in a multi-antenna system according to a second embodiment of the present invention.
Figure 4:
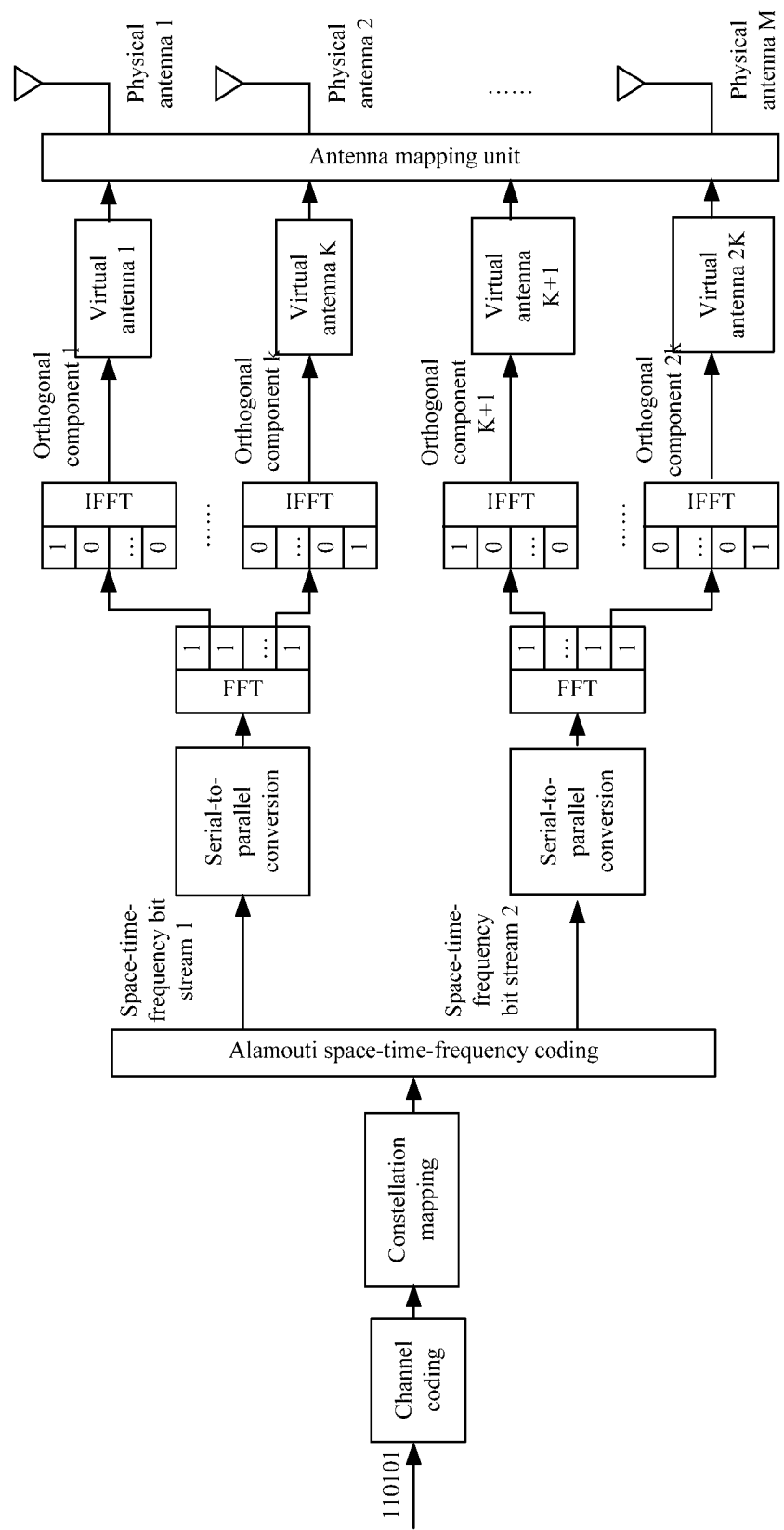
FIG. 4 is a block diagram showing an example of the method for data signal transmission in a multi-antenna system according to the second embodiment of the present invention.

FIG. 3 is a flowchart of a method for data signal transmission in a multi-antenna system according to a second embodiment of the present invention. FIG. 4 is a block diagram showing a principle of the method for data signal transmission according to the second embodiment of the present invention. In this embodiment, before a symbol stream of a broadcast multicast signal is divided into K orthogonal components, space-time-frequency coding is performed on the broadcast multicast signal to form k1 space-time-frequency bit streams, in which k1 is a natural number that is greater than or equal to 2. Each space-time-frequency bit stream is referred to as one symbol stream of the broadcast multicast signal. This embodiment is described by taking the space-time-frequency coding being an "Alamouti" coding technology as an example as follows.

Step 301: A transmitter performs processing, such as channel coding and constellation mapping processing, on information bit stream of a broadcast multicast signal to form symbol streams in the form of $s_1, s_2, \ldots$. The information bit stream may be in the form of "0" and "1".

Step 302: The transmitter performs "Alamouti" space-time-frequency coding on the processed broadcast multicast signal to form k1 space-time-frequency bit streams.

For the space-time-frequency coding, every two symbol codes are formed as one symbol block. For example, after the coding, a symbol block $[s_1, s_2]$ forms two mutually orthogonal space-time-frequency bit streams $$\begin{bmatrix} s_1 & s_2^* \\ s_2 & -s_1^* \end{bmatrix},$$

which means that the streams are transmitted through two antennas at two time-frequencies. The symbol stream before the coding can be restored though the space-time-frequency bit stream of any antenna. The number of the space-time-frequency bit streams that are formed through the space-time-frequency coding at the same time is recorded as k1. In this embodiment, k1=2. Afterward, the space-time-frequency bit stream is divided into K orthogonal components. Specifically, for example, one or multiple of the space-time-frequency bit streams may be divided into K orthogonal components.

Step 303: The transmitter divides the two space-time-frequency bit streams into K orthogonal components respectively, and thus obtains two groups of K orthogonal components. In practical application, the division of the orthogonal components may also be performed on the complex symbol stream with a set length which is formed by a plurality of subsequent multiple symbol blocks of the space-time-frequency bit streams.

"Alamouti" coding in the preceding technical solution may also be any space-time-frequency coding technology that can output any number of space-time-frequency bit streams. That is, the operation about the coding may also be as the follows:

The space-time-frequency coding is performed on the broadcast multicast signals to form the k1 space-time-frequency bit streams. Each space-time-frequency bit stream serves as a symbol stream and is divided into a group of K orthogonal components.

Figure 5:
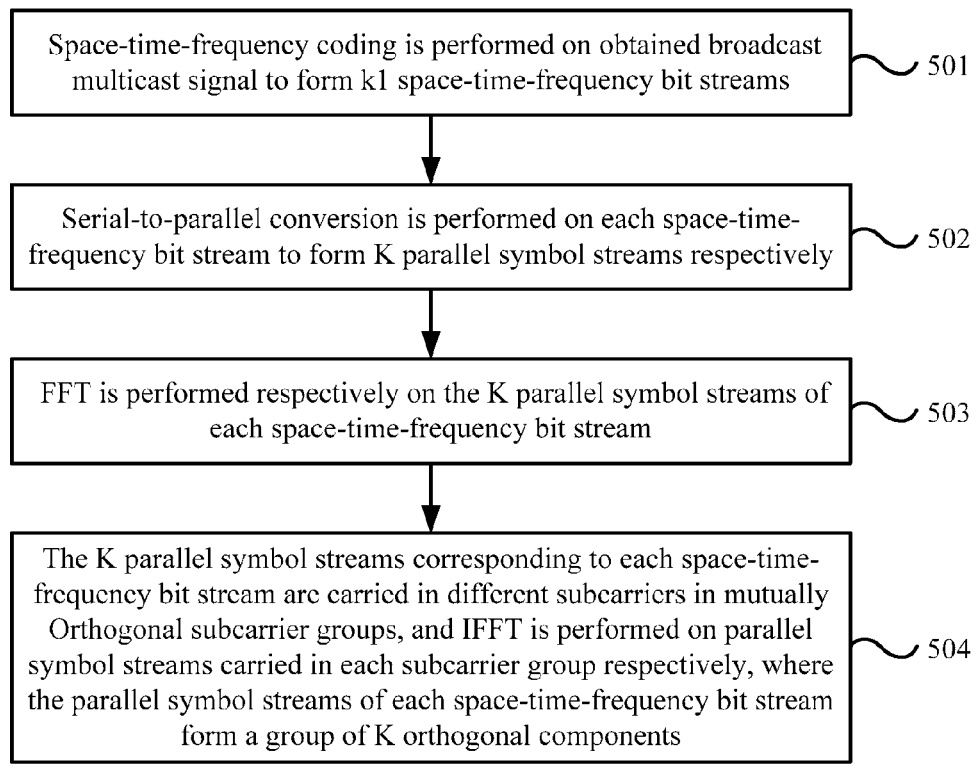
FIG. 5 is a flowchart of a method based on space-time-frequency coding according to the second embodiment of the present invention.

In the preceding step 303, mutually orthogonal frequency bands, subcarrier groups, or code groups may still be used to obtain the K orthogonal components. In this embodiment, each space-time-frequency bit stream is divided into K mutually orthogonal frequency bands which are provided for K virtual antennas respectively. The division of one space-time-frequency bit stream into different frequency components may be implemented by a filter bank, and specifically, may be implemented by using a fast Fourier transform or inverse fast Fourier transform (FFT/IFFT). A procedure of dividing the complex symbol stream of a broadcast multicast signal into K orthogonal components may include the following steps, as shown in FIG. 5, which may be understood with reference to the example in FIG. 4.

Step 501: Space-time-frequency coding is performed on obtained broadcast multicast signal to form k1 space-time-frequency bit streams, as shown in the example in FIG. 4, k1=2.

Step 502: Serial-to-parallel conversion is performed on each space-time-frequency bit stream to form K parallel symbol streams respectively. For each space-time-frequency bit stream, an operation of division into K orthogonal components is independent, so that the values of the K corresponding to each space-time-frequency bit stream may be equal, and may also be unequal. In the example as shown in FIG. 4, the values of the K corresponding to each space-time-frequency bit stream are equal.

Step 503: FFT is performed respectively on the K parallel symbol streams of each space-time-frequency bit stream. In practical application, this step may be omitted.

Step 504: The K parallel symbol streams corresponding to each space-time-frequency bit stream are carried in different subcarriers of mutually orthogonal subcarrier groups, and IFFT is performed on the parallel symbol streams carried in each subcarrier group respectively. The parallel symbol streams of each space-time-frequency bit stream form a group of K orthogonal components. When the IFFT is performed, the subcarrier group carrying data is marked as "1" while other subcarrier groups are set to "0", as shown in FIG. 4.

In the foregoing technical solution, the data of each space-time-frequency bit stream is divided into K data blocks through the serial-to-parallel conversion, each data block is carried by a group of OFDM subcarriers, and other subcarriers are set to "0". After the IFFT, orthogonal components of corresponding frequency components are obtained, which is similar to an OFDMA technology. Before the IFFT, FFT may optionally be performed once, which is similar to a Single Carrier FDMA (SC-FDMA) technology.

With the technical solution in this embodiment, a power amplifier with low power may be used for power amplification, and unrelated orthogonal components are superposed for omni-directional cell coverage, so that a broadcast multicast signal can be transmitted. Additionally, in this embodiment, a mature space-time-frequency coding technology may also be used to improve utilization efficiency of a frequency band. A receiver does not need to predetermine the number of physical antennas, and a hardware structure on the receiver does not need to be adjusted even if a multi-antenna system of a base station needs to be adjusted.

Figure 6:
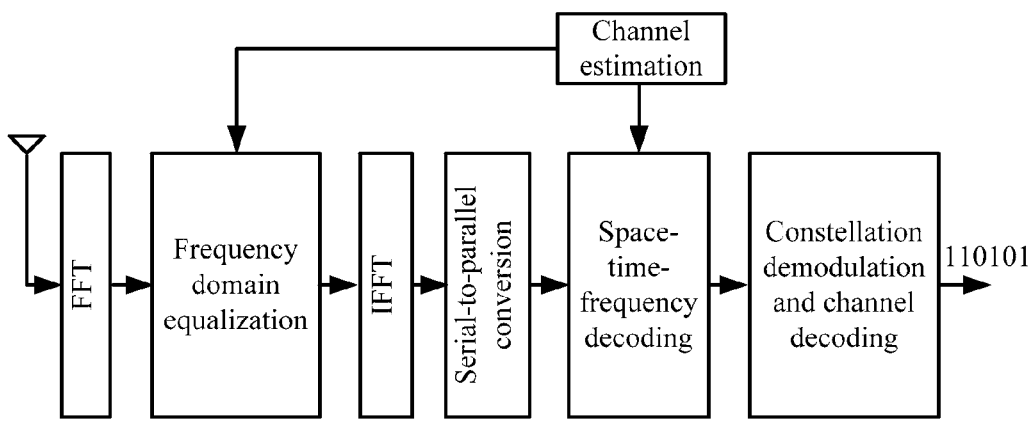
FIG. 6 is a schematic structural diagram of a receiver applicable to the second embodiment of the present invention.

A structure of the receiver applicable to the technical solution in this embodiment may be as shown in FIG. 6. FFT is performed on a signal received from a physical antenna, and the signal is converted to a frequency domain. If a transmitter adopts SC-FDMA, frequency domain equalization needs to be performed on the received signal by adopting a result of channel estimation, and the signal is transformed to a time domain through the IFFT. If the transmitter adopts OFDMA, this step may be omitted. Subsequently, after parallel-to-serial conversion, space-time-frequency decoding, and constellation demodulation and channel decoding, an information bit stream in the form of "0" and "1" is obtained.

Figure 7:
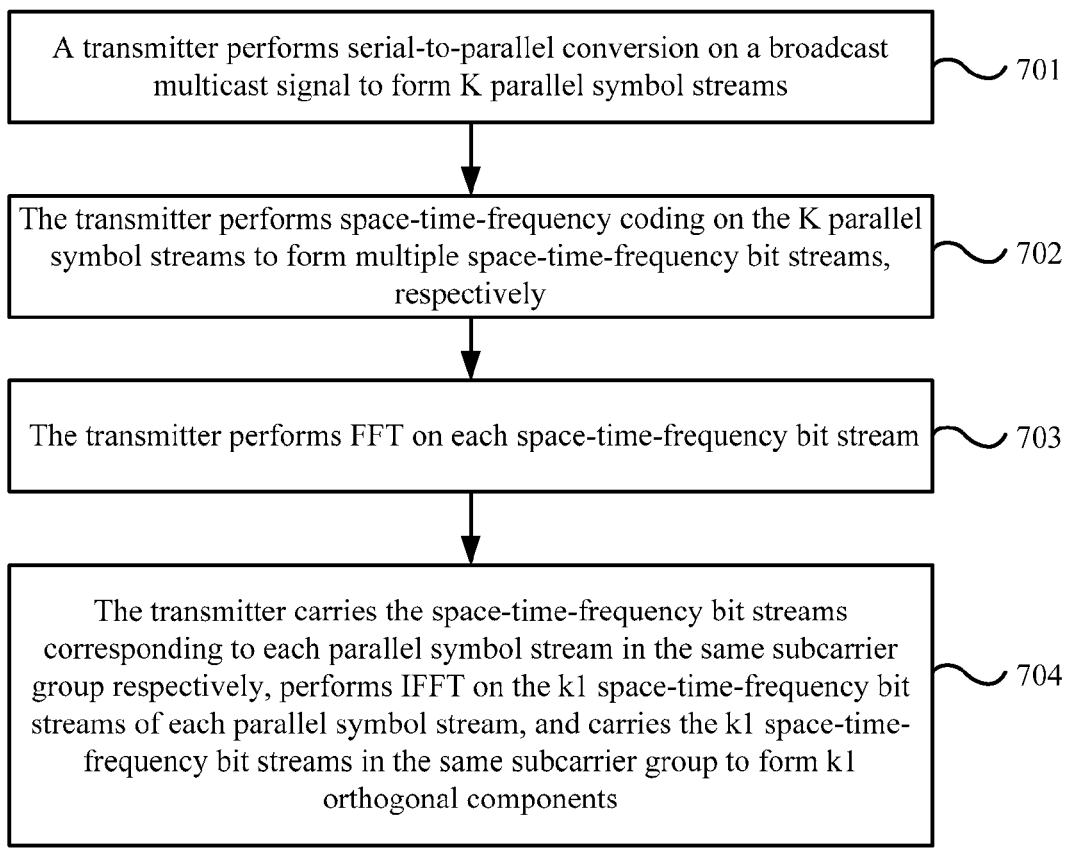
FIG. 7 is a flowchart of a method for data signal transmission in a multi-antenna system according to a third embodiment of the present invention.
Figure 8:
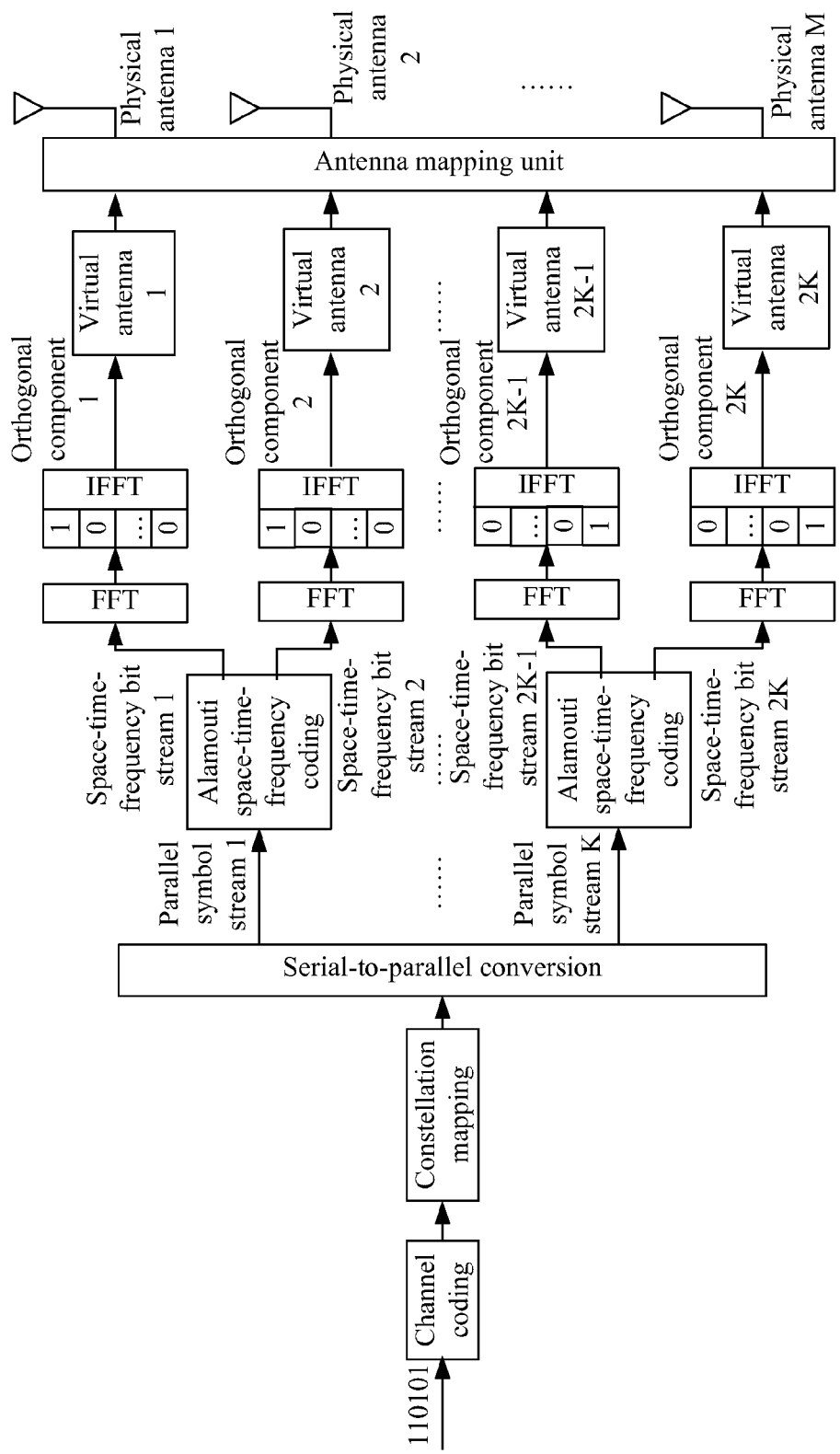
FIG. 8 is a block diagram showing an example of the method for data signal transmission in a multi-antenna system according to the third embodiment of the present invention.

FIG. 7 is a flowchart of a method for data signal transmission in a multi-antenna system according to a third embodiment of the present invention, and FIG. 8 is a block diagram of the method for data signal transmission in a multi-antenna system according to the third embodiment. This embodiment is different from the second embodiment in that: In the second embodiment, uniform space-time-frequency coding is adopted for symbol streams, and each space-time-frequency bit stream after the coding is divided into K orthogonal components and the K orthogonal components are transmitted in K subcarrier groups. While in this embodiment, serial-to-parallel conversion is performed on the symbol streams of a broadcast multicast signal with constellation mapping to form K parallel symbol streams, each parallel symbol stream forms one of the K orthogonal components. Space-time-frequency coding may be performed on each parallel symbol stream separately to obtain multiple space-time-frequency bit streams, and the multiple space-time-frequency bit streams are carried in one subcarrier group and are transmitted through multiple virtual antennas. As shown in FIG. 7, the method may include the following steps:

Step 701: A transmitter performs serial-to-parallel conversion on a complex symbol stream of a broadcast multicast signal after processing such as signal coding and constellation mapping, to form K parallel symbol streams.

Step 702: The transmitter performs space-time-frequency coding on the K parallel symbol streams to form multiple space-time-frequency bit streams, respectively.

Each parallel symbol stream forms at least k1 space-time-frequency bit streams, in which k1 is a natural number that is greater than or equal to 2. In an example as shown in FIG. 8, an "Alamouti" coding technology is adopted, and the number K of the space-time-frequency bit streams that are formed by each parallel symbol stream is equal, that is, k1=2.

Step 703: The transmitter performs FFT on each space-time-frequency bit stream. In practical application, this step may also be omitted.

Step 704: The transmitter carries the space-time-frequency bit streams corresponding to each parallel symbol stream in a subcarrier group, with one parallel symbol stream corresponding to the same subcarrier group. Subcarrier groups for all parallel symbol streams are mutually orthogonal with each other. IFFT is performed respectively on the k1 space-time-frequency bit streams corresponding to each parallel symbol stream. The k1 space-time-frequency bit streams are carried in the same subcarrier group that is corresponding to the parallel symbol stream, and other subcarrier groups are set to "0" to form k1 orthogonal components which are respectively transmitted through k1 virtual antennas in turn. As shown in FIG. 8, the subcarrier group carrying data are marked as "1", and other subcarrier groups are set to "0". An orthogonal component that is corresponding to any one space-time-frequency bit stream is selected from each parallel symbol stream to form a group of K orthogonal components, and space-time-frequency bit streams of the K parallel symbol streams are combined randomly to form multiple groups of K orthogonal components.

Figure 9:
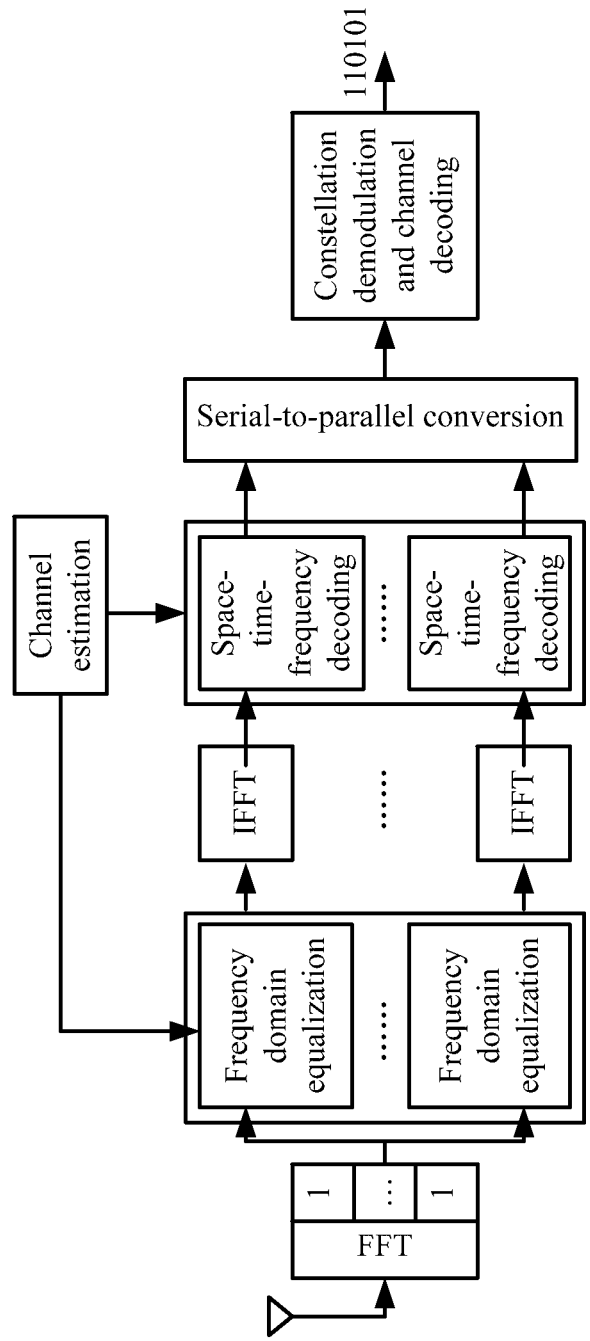
FIG. 9 is a schematic structural diagram of a receiver applicable to the third embodiment of the present invention.

A structure of a receiver applicable to the technical solution in this embodiment may be as shown in FIG. 9. A signal received from a physical antenna is firstly converted to a frequency domain through FFT, and frequency domain equalization is performed by using a result of channel estimation. If the transmitter adopts SC-FDMA, transformation to a time domain through IFFT is needed, and if the transmitter adopts OFDMA, this step of time domain transformation may be omitted. Then space-time-frequency decoding is performed, and subsequently after parallel-to-serial conversion, constellation demodulation and channel decoding, an information bit stream in the form of "0" and "1" is obtained.

The preceding second and third embodiments are both described through an example in which all bit streams that are formed by space-time-frequency coding are transmitted by physical antennas of one base station. A method for data signal transmission in a multi-antenna system is also provided according to a fourth embodiment of the present invention, which is on the basis of the second embodiment. In the fourth embodiment, a signal may be transmitted through physical antennas of multiple base stations. Based on the fourth embodiment, the step of providing K orthogonal components corresponding to each k1 space-time-frequency bit streams as transmission signals for K virtual antennas may be as follows:

Space-time-frequency coding is performed on a symbol stream that is obtained after channel coding and constellation mapping to obtain k1 space-time-frequency bit streams. K orthogonal components corresponding to each k1 space-time-frequency bit stream are provided as transmission signals for virtual antennas of X base stations, in which the K orthogonal components corresponding to the same space-time-frequency bit stream are provided for K virtual antennas of the same base station, and X is a natural number that is greater than or equal to 2 and smaller than or equal to k1. That is, the same base station may transmit the K orthogonal components corresponding to one or more space-time-frequency bit streams.

Figure 10:
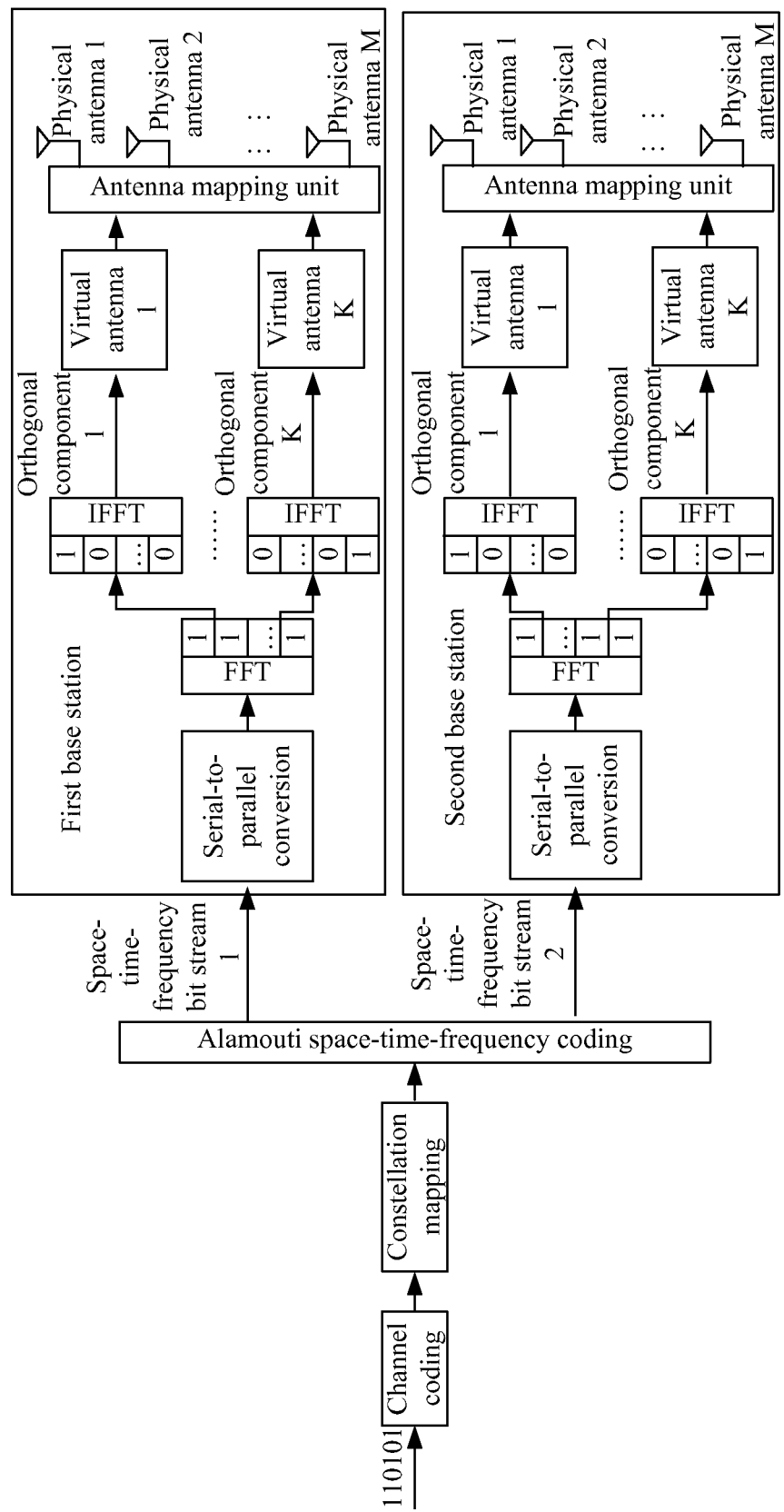
FIG. 10 is a block diagram showing an example of a method for data signal transmission in a multi-antenna system according to a fourth embodiment of the present invention.

This embodiment is described by taking k1=X=2 as an example. FIG. 10 is a block diagram of the method for data signal transmission in a multiple-antenna system according to the fourth embodiment of the present invention. Uniform space-time-frequency coding is performed once and two space-time-frequency bit streams are provided for a first base station and a second base station respectively. FFT/IFFT processing is performed in the first base station and the second base station is similar to that in the second embodiment, which is not repeatedly described here.

A method for data signal transmission in a multi-antenna system is also provided in according to a fifth embodiment of the present invention. In this embodiment, a transmitter performs serial-to-parallel conversion on a complex symbol stream of a broadcast multicast signal after processing such as signal coding and constellation mapping, so as to form K parallel symbol streams, and correspondingly form multiple groups of K orthogonal components. In this embodiment, the step of providing the multiple groups of K orthogonal components as transmission signals for K virtual antennas may include the following steps:

performing space-time-frequency coding on each parallel symbol stream to obtain multiple space-time-frequency bit streams respectively, and dividing the multiple space-time-frequency bit streams into Y groups which are provided for Y base stations, in which each group of K orthogonal components is respectively provided for K virtual antennas of respective base stations for transmission, and Y is a natural number that is greater than or equal to 2.

Figure 11:
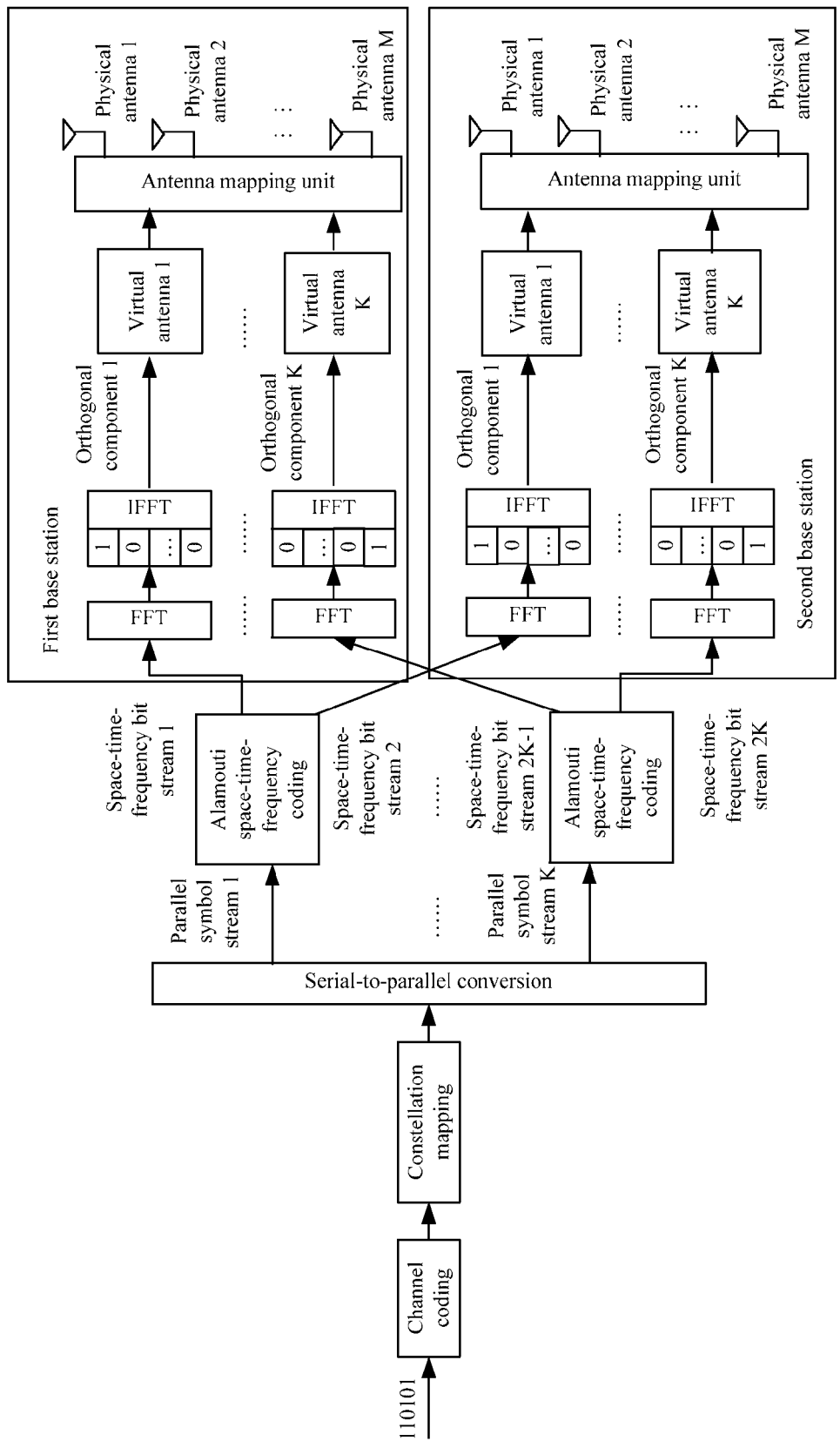
FIG. 11 is a block diagram showing an example of a method for data signal transmission in a multi-antenna system according to a fifth embodiment of the present invention.

FIG. 11 is a block diagram example showing the method for data signal transmission in a multi-antenna system according to the preceding fifth embodiment of the present invention. Here in this example, each parallel symbol stream being formed k1 space-time-frequency bit streams and k1=2 are taken as an example for description. Firstly, serial-to-parallel conversion is performed to form K parallel symbol streams, and then space-time-frequency coding is performed on the K parallel symbol streams respectively. Two space-time-frequency bit streams formed through space-time-frequency coding each time are provided for a first base station and a second base station respectively. That is, the first space-time-frequency bit stream of each of the K parallel symbol streams forms a group of K orthogonal components, and is provided for the first base station; and the second space-time-frequency bit stream of each of the K parallel symbol streams forms another group of K orthogonal components, and is provided for the second base station. FFT/IFFT processing in the first base station and the second base station is similar to that in the third embodiment, and is not repeatedly described here. One or multiple groups of K orthogonal components may be transmitted by the same base station.

A form of transmitting, through a single base station, all space-time-frequency bit streams may be referred to as centralized space-time-frequency coding, and a form of transmitting, through each base station, only a part of bit streams among all bit streams on which the space-time-frequency coding is performed may be referred to as distributed space-time-frequency coding. For a centralized space-time-frequency coding situation, each frequency band occupies two virtual antennas of a base station. For the distributed space-time-frequency coding, only one virtual antenna is needed for each frequency band. That is, with the distributed space-time-frequency coding, there may be more frequency bands. Therefore, a signal frequency band on each physical antenna is narrower, and in this way, a lower power peak-to-average ratio may be realized.

Figure 12:
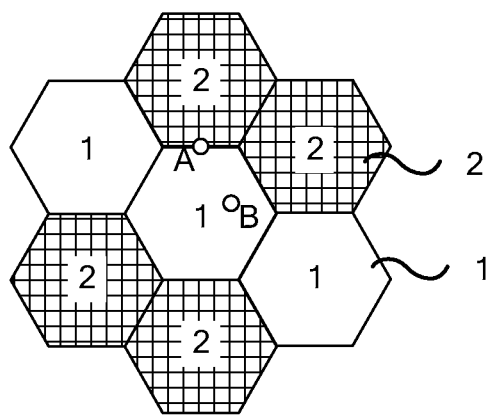
FIG. 12 is an allocation scheme in which a bit stream multiplexing coefficient is 2 according to an embodiment of the present invention.

If the distributed space-time-frequency coding scheme is adopted, how the space-time-frequency bit streams are allocated between different base stations arises naturally, which is similar to frequency multiplexing. FIG. 12 shows an allocation scheme in which a bit stream multiplexing coefficient is 2. That is, two space-time-frequency bit streams are generated, among which, K orthogonal components of one of the space-time-frequency bit stream are transmitted through a first base station 1, and the K orthogonal components of the other space-time-frequency bit stream are transmitted through a second base station 2. The base stations that transmit the K orthogonal components of different space-time-frequency bit streams, for example, the base stations 1 and 2 in the preceding, can be disposed separately. The multiplexing allocation scheme may be applied in a system adopting "Alamouti" coding. When a mobile terminal is located at a point A at the edge of a cell, the strength of a received signal is relatively weak, but the orthogonal component signals of space-time-frequency bit streams that are transmitted by two base stations and can be received by the mobile terminal, and thus the reception quality may be effectively improved by using a diversity gain that is provided by the space-time-frequency coding. When the mobile terminal is located at a point B at the center of the cell, the mobile terminal mainly receives an orthogonal component signal of a space-time-frequency bit stream transmitted by the current cell, and at this time, the signal strength is quite good, reliable demodulation can be ensured by only one space-time-frequency bit stream. In both cases that at the cell edge and the cell center, a hardware structure and an algorithm of a receiver of the mobile terminal do not need to be changed at all. This also means that different bit stream planning schemes, that is, which base station is allocated with which space-time-frequency bit stream, only affect the reception quality of the receiver to some extent, but do not cause that the receiver cannot demodulate a signal correctly at all. This feature facilitates network deployment in a complex propagation environment. Similarly, space-time-frequency coding in which a bit stream multiplexing coefficient is N is applicable to space-time-frequency coding in which N space-time-frequency bit streams are output, where N is a natural number that is greater than or equal to 2.

The technical solution provided in each embodiment of the present invention has an advantage of enabling a multi-antenna system to provide high quality transmission of a broadcast multicast signal with a low cost. In detail, the advantages are as follows:

(1) K orthogonal components of each symbol stream are transmitted through K virtual antennas, and transmission signals on the K virtual antennas are mutually orthogonal, and thus no interference effect occurs. Therefore, a power amplifier with low power may be used for amplification, and a gain is increased through signal superposition, thus cell-wide coverage is realized.

(2) Signals of K virtual antennas of a symbol stream are superposed in the air, the receiver cannot distinguish that there are K virtual antennas, and a structure of the receiver is the same as a structure of a receiver that is corresponding to a single transmitting antenna, so that good compatibility is realized.

(3) Power of each physical antenna is fully utilized, multiple power amplifiers with low power may be adopted, while an expensive high-power amplifier is avoided, so that a system cost is greatly decreased.

(4) The method is applicable to a multi-antenna system with any number and arrangement of physical antennas, and thus has excellent system extensibility.

(5) A peak-to-average ratio problem is a critical problem of conventional OFDMA, and a too high peak-to-average ratio decreases the effective output power of a power amplifier. A peak-to-average ratio of OFDMA is caused by superposition of many subcarriers, and if a bandwidth is decreased on each radio frequency channel, and the number of subcarriers is reduced, the peak-to-average ratio may be decreased effectively. An extreme case is that each physical antenna sends only one subcarrier, so that the peak-to-average ratio problem of an OFDMA system is thoroughly solved. In the solution provided in the embodiments of the present invention, the peak-to-average ratio of the OFDMA system is decreased by using this method.

(6) A distributed space-time-frequency coding technology is more advantageous than a centralized space-time-frequency coding technology in terms of peak-to-average ratio performance.

The technical solution provided in the preceding embodiments of the present invention may be widely applied to transmission of a broadcast multicast signal, such as a common channel signal, or a signal transmitted in a broadcast network such as a digital broadcast network or a digital television network, in a multi-antenna system.

Figure 13:
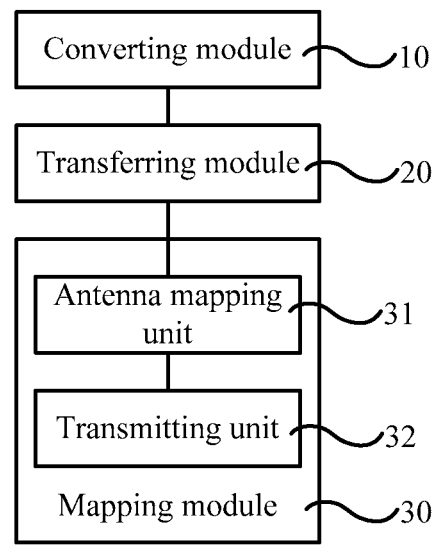
FIG. 13 is a schematic structural diagram of an apparatus for data signal transmission in a multi-antenna system according to a sixth embodiment of the present invention.

An apparatus for data signal transmission in a multi-antenna system is provided according to a sixth embodiment of the present invention. As shown in FIG. 13, the transmission apparatus may include: a converting module 10, a transferring module 20, and a mapping module 30. The converting module 10 is configured to divide a symbol stream of a data signal into K orthogonal components, in which a modulus of an inner product of each of the K orthogonal components is equal to zero or smaller than a set value, and the data signal can be restored through the K orthogonal components, but cannot be restored through the remaining (K−1) orthogonal components of the K orthogonal components apart from any one non-zero orthogonal component, K is a natural number that is greater than or equal to 2. The transferring module 20 is configured to provide the K orthogonal components as transmission signals for K virtual antennas. The mapping module 30 is configured to map K transmission signals of the K virtual antennas to M physical antennas for transmission, in which M is a natural number that is greater than or equal to 2.

The mapping module 30 may further include: an antenna mapping unit 31 and a transmitting unit 32. The antenna mapping unit 31 is configured to map the K transmission signals of the K virtual antennas to M transmission signals according to an M*K dimensional antenna mapping matrix. The transmitting unit 32 is configured to transmit the M transmission signals from M physical antennas respectively.

The transmission apparatus in this embodiment may implement the technical solution in the first embodiment of the present invention. The K orthogonal components are orthogonal or nearly orthogonal with each other. If a transmission signal of a virtual antenna is mapped to a physical antenna in a one-to-one manner for transmission, no interference effect occurs between the orthogonal components that are transmitted through the physical antennas or the interference effect is in an acceptable range, so that omni-directional cell coverage is realized. Furthermore, transmission capability of each physical antenna is fully utilized, so that a power amplifier with lower power may be used. For a receiver, it is unnecessary to identify that a received signal is transmitted by multiple physical antennas, and the reception is similar to receiving a signal that is transmitted by a single physical antenna, and has good compatibility.

Figure 14:
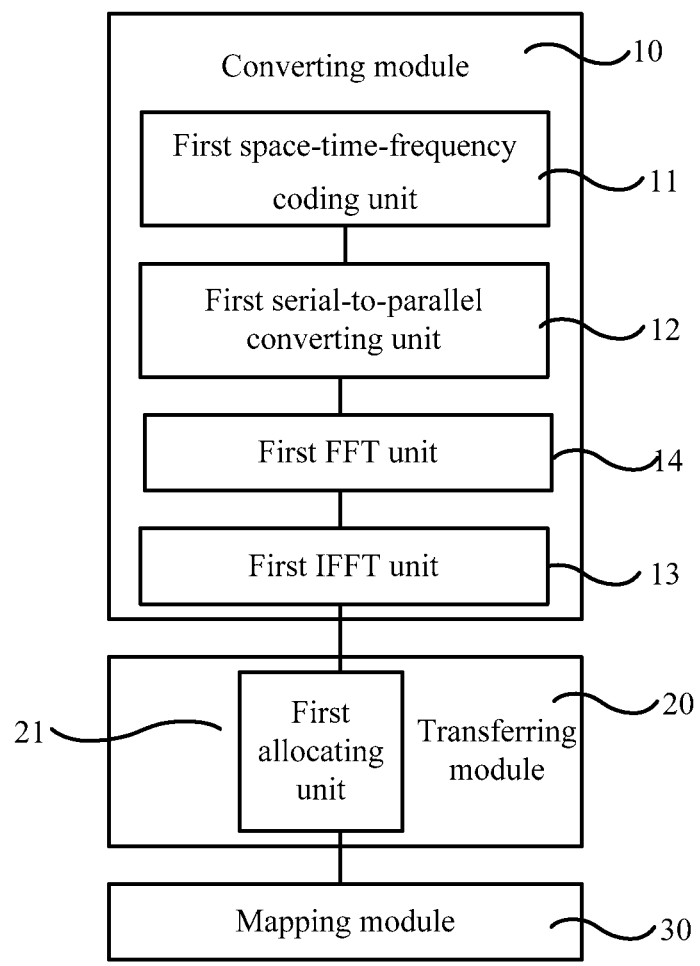
FIG. 14 is a block diagram of an apparatus for data signal transmission in a multi-antenna system according to a seventh embodiment of the present invention.

Another apparatus for data signal transmission in a multi-antenna system is also provided according to a seventh embodiment of the present invention. As shown in FIG. 14, the apparatus includes a converting module 10, a transmission module 20, and a mapping module 30. The converting module 10 may include: a first space-time-frequency coding unit 11, a first serial-to-parallel converting unit 12, and a first IFFT unit 13. The first space-time-frequency coding unit 11 is configured to perform space-time-frequency coding on an obtained data signal to form k1 space-time-frequency bit streams, in which each of the space-time-frequency bit streams serves as one symbol stream of the data signal, and k1 is a natural number that is greater than or equal to 2. The first serial-to-parallel converting unit 12 is configured to perform serial-to-parallel conversion on each of the space-time-frequency bit streams to form K parallel symbol streams. The first IFFT unit 13 is configured to carry the K parallel symbol streams corresponding to each space-time-frequency bit stream in mutually orthogonal subcarrier groups, and perform IFFT on a parallel symbol stream carried in each subcarrier group to form K orthogonal components respectively.

Furthermore, the converting module 10 optionally includes a first FFT unit 14, which is disposed between the first serial-to-parallel converting unit 12 and the first IFFT unit 13, and is configured to perform FFT on the parallel symbol stream.

The preceding transmission apparatus may implement the transmission method provided in the preceding second embodiment of the present invention, and by introducing a space-time-frequency coding technology, a frequency band utilization ratio may be further improved.

The transferring module 20 in this embodiment may include: a first allocating unit 21. The first allocating unit 21 is configured to provide the K orthogonal components corresponding to each of the k1 space-time-frequency bit streams as transmission signals for virtual antennas of X base stations, in which the K orthogonal components corresponding to each space-time-frequency bit stream are provided for the K virtual antennas of the same base station, and X is a natural number that is greater than or equal to 2 and is smaller than or equal to k1.

The preceding transmission apparatus may implement the transmission method provided in the fourth embodiment of the present invention, and a distributed space-time-frequency coding technology is adopted, which is more advantageous than a centralized space-time-frequency coding technology in terms of peak-to-average ratio performance.

Figure 15:
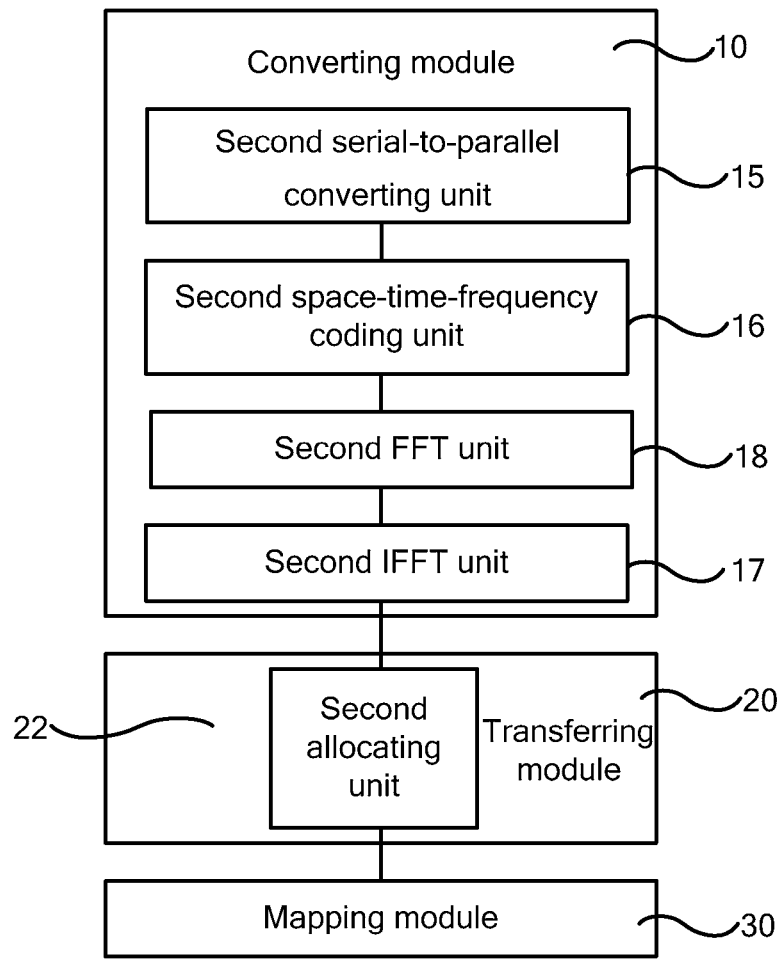
FIG. 15 is a block structural diagram of an apparatus for data signal transmission in a multi-antenna system according to an eighth embodiment of the present invention.

Another apparatus for data signal transmission in a multi-antenna system is provided according to an eighth embodiment of the present invention. As shown in FIG. 15, the apparatus includes a converting module 10, a transmission module 20, and a mapping module 30. The converting module 10 may include: a second serial-to-parallel converting unit 15, a second space-time-frequency coding unit 16, and a second IFFT unit 17. The second serial-to-parallel converting unit 15 is configured to perform serial-to-parallel conversion on a symbol stream of a data signal to form K parallel symbol streams. The second space-time-frequency coding unit 16 is configured to perform space-time-frequency coding on each of the K parallel symbol streams to form k1 space-time-frequency bit streams respectively, in which k1 is a natural number that is greater than or equal to 2. The second IFFT unit 17 is configured to carry the space-time-frequency bit streams corresponding to the same parallel symbol stream in the same subcarrier group, and perform IFFT on the k1 space-time-frequency bit streams of each parallel symbol stream to form multiple orthogonal components respectively. An orthogonal component corresponding to any one space-time-frequency bit stream of each parallel symbol stream is selected to form a group of K orthogonal components, and a random combination of the space-time-frequency bit streams of the K parallel symbol streams forms multiple groups of K orthogonal components.

Furthermore, the converting module 10 optionally includes a second FFT unit 18, which is disposed between the second serial-to-parallel converting unit 16 and the second IFFT unit 17, and is configured to perform FFT on the space-time-frequency bit stream.

The preceding transmission apparatus as described in the eighth embodiment may implement the transmission method provided in the third embodiment of the present invention, and by introducing a space-time-frequency coding technology, a frequency band utilization ratio may further be improved.

Furthermore, the transferring module 20 may include: a second allocating unit 22, configured to provide the multiple space-time-frequency bit streams of each parallel symbol stream for virtual antennas of Y base stations respectively. Each group of K orthogonal components is respectively provided for K virtual antennas of one base station. Y is a natural number that is greater than or equal to 2.

The preceding transmission apparatus may implement the transmission method provided in the fifth embodiment of the present invention, and a distributed space-time-frequency coding technology is adopted, which is more advantageous than a centralized space-time-frequency coding technology in terms of peak-to-average ratio performance.

Figure 16:
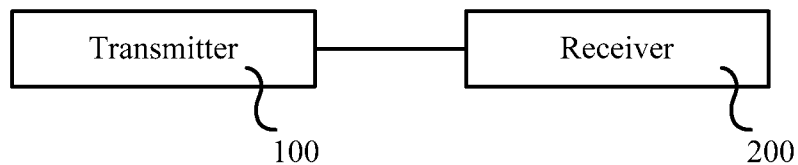
FIG. 16 is a block structural diagram of a system for data signal transmission in a multi-antenna system according to a ninth embodiment of the present invention.

FIG. 16 is a schematic structural diagram of a system for data signal transmission in a multi-antenna system according to a ninth embodiment of the present invention. The transmission system includes at least one transmitter 100 and at least one receiver 200. The transmitter 100 is configured to: divide a symbol stream of a data signal into K orthogonal components, in which K is a natural number that is greater than or equal to 2, a modulus of an inner product of any two of the K orthogonal components is equal to zero or smaller than a set value, the data signal can be restored through the K orthogonal components and cannot be restored through the remaining (K−1) of the K orthogonal components after any one non-zero orthogonal component is removed from the K orthogonal components; provide the K orthogonal components as transmission signals for K virtual antennas respectively; and map K transmission signals of the K virtual antennas to M physical antennas to transmit, in which M is a natural number that is greater than or equal to 2. The receiver 200 is configured to receive signals of the K orthogonal components from transmitter, and obtain the data signal after demodulation processing.

The transmitter in the transmission system in this embodiment may adopt the transmission apparatus according to the embodiments of the present invention, and implement the transmission methods provided in the embodiments of the present invention. The K orthogonal components transmitted by the transmitter are mapped through the virtual antennas to the physical antennas for transmission, and no interference effect occurs between the orthogonal components when transmitted through the physical antennas, or the interference effect is acceptable, so that omni-directional cell coverage is obtained. Furthermore, transmission capability of each physical antenna is fully utilized, so that a power amplifier with lower power may be used. For the receiver, it is unnecessary to identify that a received signal is transmitted by multiple physical antennas, and the reception is similar to receiving a signal that is transmitted by a single physical antenna, and has good compatibility.

The data signal in the foregoing embodiments may be include a broadcast multicast signal or include a unicast signal. The technical solutions in the embodiments of the present invention have a higher practical value when being applied to transmit the broadcast multicast signal.

Persons of ordinary skill in the art may understand that at least part of steps in the forgoing method embodiments may be implemented by a program instructing relevant hardware. The preceding program may be stored in a computer readable storage medium, and when the program is executed, the steps of the preceding method embodiments are executed; and the preceding storage medium may be any medium capable of storing program codes, such as an ROM, an RAM, a magnetic disk, or an optical disk.

Finally, it should be noted that the preceding embodiments are used only to describe the technical solutions of the present invention, but are not intended to limit the present invention. Although the present invention is described in detail with reference to the foregoing embodiments, persons of ordinary skill in the art should understand that modifications may still be made to the technical solutions described in the foregoing embodiments, or equivalent replacements may be made to some technical features of the technical solutions, however, these modifications or replacements do not make the essence of the corresponding technical solutions depart from the spirit and scope of the technical solutions in the embodiments of the present invention.

What is claimed is:

1. A method for data signal transmission in a communication system, wherein, the method comprises:
    performing space-time-frequency coding on a stream of a data signal to form k1 space-time-frequency bit streams, wherein k1 is a natural number that is greater than or equal to 2;
    dividing P of the k1 space-time-frequency bit streams into $K_i$ (i=1, 2, ..., P) orthogonal components respectively, wherein P is a natural number that is greater than or equal to 2 and is smaller than or equal to k1, and $K_i$ is a natural number that is greater than or equal to 2, a modulus of an inner product of any two of the $K_i$ orthogonal components is equal to zero or smaller than a set value, and the data signal can be restored through the $K_i$ orthogonal components, but cannot be restored through the remaining ($K_i$−1) of the $K_i$ orthogonal components apart from any one non-zero orthogonal component; and
    providing all orthogonal components corresponding to the P space-time-frequency bit streams for N base stations for transmission, wherein N is a natural number that is greater than or equal to 2 and is smaller than or equal to P,
    wherein, the step of providing for the N base stations for transmission comprises:
    providing all $K_i$ orthogonal components corresponding to the P space-time-frequency bit streams as transmission signals for virtual antennas of the N base stations, wherein a sum of the number $L_j$ (j=1, 2, ..., N) of virtual antennas of each base station is equal to a sum of a value of the $K_i$ of each space-time-frequency bit stream; and
    mapping the transmission signals corresponding to the $L_j$ virtual antennas of each base station to $M_j$ physical antennas of the corresponding base station respectively to transmit, wherein $M_j$ is a natural number that is greater than or equal to 2;
    wherein the number $L_j$ of the virtual antennas of each base station is twice the number $M_j$ of the physical antennas of the corresponding base station, and one virtual antenna is corresponding to two cross-polarized physical antennas;
    wherein an antenna mapping matrix is represented by the following formula:

$$\begin{bmatrix} x_1 \\ x_2 \\ \vdots \\ x_M \end{bmatrix} = \begin{bmatrix} w_1^{(1)} & w_1^{(2)} & \cdots & w_1^{(K)} \\ w_2^{(1)} & w_2^{(2)} & \cdots & w_2^{(K)} \\ \vdots & \vdots & \ddots & \vdots \\ w_M^{(1)} & w_M^{(2)} & \cdots & w_M^{(K)} \end{bmatrix} \begin{bmatrix} x'_1 \\ x'_2 \\ \vdots \\ x'_K \end{bmatrix}$$

where, $x'_1\ x'_2 \ldots x'_K$ represent transmission signals of K virtual antennas, $x_1\ x_2 \ldots x_M$ represent transmission signals of M physical antennas each virtual antenna k corresponds to a weight vector $[w_1^{(k)}\ w_2^{(k)} \ldots w_M^{(k)}]$, in which k is the sequence number of a virtual antenna.

2. The method according to claim 1, wherein the $K_i$ orthogonal components corresponding to the same space-time-frequency bit stream are provided for $K_i$ virtual antennas of the same base station among the N base stations.

3. The method according to claim 1, wherein the value of the $K_i$ corresponding to each space-time-frequency bit stream is equal.

4. The method according to claim 1, wherein the step of dividing comprises:
    performing serial-to-parallel conversion on each of the P space-time-frequency bit streams to form $K_i$ parallel symbol streams respectively; and
    carrying the $K_i$ parallel symbol streams in mutually orthogonal subcarrier groups, and performing inverse fast Fourier transform on the parallel symbol streams that are carried in the subcarrier groups to form the $K_i$ orthogonal components.

5. The method according to claim 1, wherein the transmission signals corresponding to the $L_j$ virtual antennas of each base station are respectively mapped to the $M_j$ physical antennas of the corresponding base station according to an $M_j*L_j$ antenna mapping matrix.

6. The method according to claim 1, wherein the dividing the space-time-frequency bit streams into the Ki orthogonal components is performed by adopting mutually orthogonal frequency bands, mutually orthogonal subcarrier groups, or mutually orthogonal code groups.

7. The method according to claim 1, wherein when k1=P=N=2,
the step of providing all $K_i$ orthogonal components of the P space-time-frequency bit streams for the virtual antennas of the N base stations comprises: providing $K_1$ orthogonal components that are corresponding to a first one of the P space-time-frequency bit streams as transmission signals for $K_1$ virtual antennas of a first base station, and providing $K_2$ orthogonal components that are corresponding to a second one of the P space-time-frequency bit streams as transmission signals to $K_2$ virtual antennas of a second base station; and
the mapping the transmission signals of the virtual antennas to the physical antennas for transmission step comprises: mapping the $K_1$ transmission signals corresponding to the $K_1$ virtual antennas to $M_1$ physical antennas of the first base station for transmission; and mapping $K_2$ transmission signals corresponding to the $K_2$ virtual antennas to $M_2$ physical antennas of the second base station for transmission, wherein $M_1$ and $M_2$ are natural numbers that are greater than or equal to 2.

8. The method according to claim 1, wherein the data signal is a broadcast multicast signal.

9. A method for data signal transmission in a communication system, comprising:
performing space-time-frequency coding on a stream of a data signal to form k1 space-time-frequency bit streams, wherein k1 is a natural number that is greater than or equal to 2;
dividing P of the k1 space-time-frequency bit streams into $K_i$ (i=1, 2, ..., P) orthogonal components respectively, wherein for each of the P space-time-frequency, a modulus of an inner product of any two of the $K_i$ orthogonal components is equal to zero or smaller than a set value, and the data signal can be restored through the $K_i$ orthogonal components, but cannot be restored through the remaining ($K_1$−1) of the $K_i$ orthogonal components apart from any one non-zero orthogonal component, wherein P is a natural number that is greater than or equal to 1 and is smaller than k1, and $K_i$ is a natural number that is greater than or equal to 2; and
providing all Ki orthogonal components corresponding to the P space-time-frequency bit streams for N base stations for transmission, wherein N is a natural number that is greater than or equal to 1 and is smaller than P,
wherein the step of providing comprises: providing all $K_1$ orthogonal components corresponding to the P space-time-frequency bit streams as transmission signals for virtual antennas of the N base stations, wherein a sum of the number $L_j$ (j=1, 2, ..., N) of virtual antennas of each base station is equal to a sum of a value of the Ki of each space-time-frequency bit stream; and mapping the transmission signals corresponding to virtual antennas of each base station to $M_j$ physical antennas of the corresponding base station respectively for transmission, wherein $M_j$ is a natural number that is greater than or equal to 2; and
providing the remaining (k1−P) of the k1 space-time-frequency bit streams for the physical antennas of (k1−P) base stations for transmission, wherein each space-time-frequency bit stream is provided for one base station for transmission;
wherein the number $L_j$ of the virtual antennas of each base station is twice the number $M_j$ of the physical antennas of the corresponding base station, and one virtual antenna is corresponding to two cross-polarized physical antennas;
wherein an antenna mapping matrix is represented by the following formula:

$$\begin{bmatrix} x_1 \\ x_2 \\ \vdots \\ x_M \end{bmatrix} = \begin{bmatrix} w_1^{(1)} & w_1^{(2)} & \ldots & w_1^{(K)} \\ w_2^{(1)} & w_2^{(2)} & \ldots & w_2^{(K)} \\ \vdots & \vdots & \ddots & \vdots \\ w_M^{(1)} & w_M^{(2)} & \ldots & w_M^{(K)} \end{bmatrix} \begin{bmatrix} x'_1 \\ x'_2 \\ \vdots \\ x'_K \end{bmatrix}$$

where $x'_1, x'_2, \ldots, x'_K$ represent transmission signals of K virtual antennas $x_1, x_2, \ldots, x_M$ present transmission signals of M physical antennas each virtual antenna k corresponds to a weight vector $[w_1^{(k)}, w_2^{(k)}, \ldots, w_M^{(k)}]$, in which k is the sequence number of a virtual antenna.

10. The method according to claim 9, wherein k1=2, P=1, and N=1.

11. The method according to claim 9, wherein the $K_i$ orthogonal components corresponding to the same space-time-frequency bit stream are provided for $K_i$ virtual antennas of the same base station.

12. The method according to claim 9, wherein a value of the $K_i$ corresponding to each of the P space-time-frequency bit streams is equal.

13. The method according to claim 9, wherein the step of dividing P of the k1 space-time-frequency bit streams into $K_i$ orthogonal components respectively comprises:
performing serial-to-parallel conversion on each of the P space-time-frequency bit streams to form $K_i$ parallel symbol streams respectively; and
carrying the $K_i$ parallel symbol streams in mutually orthogonal subcarrier groups, and performing inverse fast Fourier transform on the parallel symbol streams that are carried in the subcarrier groups to form the $K_i$ orthogonal components.

14. The method according to claim 9, wherein the transmission signals corresponding to the $L_j$ virtual antennas of each base station are respectively mapped to the $M_j$ physical antennas of the corresponding base station according to an $M_j * L_j$ antenna mapping matrix.

15. The method according to claim 9, wherein the dividing the space-time-frequency bit streams into the orthogonal components is implemented by adopting mutually orthogonal frequency bands, mutually orthogonal subcarrier groups, or mutually orthogonal code groups.

16. A transmission system, comprising at least one transmitter that is capable of communicatively connecting to a receiver, wherein the transmitter comprises a non-transitory computer readable storage medium, comprising computer program code, which when executed by a computer hardware processor causes the computer hardware processor to execute the following steps:
performing space-time-frequency coding on a stream of a data signal to form k1 space-time-frequency bit streams, wherein k1 is a natural number that is greater than or equal to 2;
dividing P of the k1 space-time-frequency bit streams into $K_i$ (i=1, 2, ..., P) orthogonal components respectively, wherein P is a natural number that is greater than or equal to 2 and is smaller than or equal to k1, and $K_i$ is a natural number that is greater than or equal to 2, wherein a modulus of an inner product of any two of the $K_i$ orthogonal components is equal to zero or smaller than a set value, and the data signal can be restored through the $K_i$ orthogonal components, but cannot be restored through the remaining $(K_i-1)$ of the $K_i$ orthogonal components apart from any one non-zero orthogonal component; and providing all $K_i$ orthogonal components corresponding to the P space-time-frequency bit streams as transmission signals for virtual antennas of the N base stations, wherein a sum of the number $L_j$ (j=1, 2, ..., N) of virtual antennas of each base station is equal to a sum of a value of the $K_i$ of each space-time-frequency bit stream; and mapping the transmission signals corresponding to the virtual antennas of each base station to $M_j$ physical antennas of the corresponding base station respectively to transmit, wherein $M_j$ is a natural number that is greater than or equal to 2;

wherein the number $L_j$ of the virtual antennas of each base station is twice the number $M_j$ of the physical antennas of the corresponding base station, and one virtual antenna is corresponding to two cross-polarized physical antennas;

wherein an antenna mapping matrix is represented by the following formula:

$$\begin{bmatrix} x_1 \\ x_2 \\ \vdots \\ x_M \end{bmatrix} = \begin{bmatrix} w_1^{(1)} & w_1^{(2)} & \cdots & w_1^{(K)} \\ w_2^{(1)} & w_2^{(2)} & \cdots & w_2^{(K)} \\ \vdots & \vdots & \ddots & \vdots \\ w_M^{(1)} & w_M^{(2)} & \cdots & w_M^{(K)} \end{bmatrix} \begin{bmatrix} x'_1 \\ x'_2 \\ \vdots \\ x'_K \end{bmatrix}$$

where, $x'_1 \ x'_2 \ \ldots \ x'_K$ represent transmission signals of K virtual antennas $x_1 \ x_2 \ \ldots \ x_m$ represent transmission signals of M physical antennas each virtual antenna k corresponds to a weight vector $[w_1^{(k)} \ w_2^{(k)} \ \ldots \ w_M^{(k)}]$, in which k is the sequence number of a virtual antenna.

17. The system according to claim 16, wherein the $K_i$ orthogonal components corresponding to the same space-time-frequency bit stream are provided for $K_i$ virtual antennas of the same base station among the N base stations.

18. The system according to claim 16, wherein the value of the $K_i$ corresponding to each space-time-frequency bit stream is equal.

* * * * *

UNITED STATES PATENT AND TRADEMARK OFFICE
CERTIFICATE OF CORRECTION

PATENT NO. : 8,605,811 B2  
APPLICATION NO. : 13/407054  
DATED : December 10, 2013  
INVENTOR(S) : Xuezhi Yang Page 1 of 1

It is certified that error appears in the above-identified patent and that said Letters Patent is hereby corrected as shown below:

In the Claims

*Column 19, Claim 6, line 2 "the Ki" should read* -- the $K_1$ --.

*Column 19, Claim 9, line 47 "all Ki" should read* -- all $K_1$ --.

*Column 19, Claim 9, line 56 "the Ki" should read* -- the $K_1$ --.

Signed and Sealed this  
Eighteenth Day of March, 2014

Michelle K. Lee  
*Deputy Director of the United States Patent and Trademark Office*